United States Patent [19]

Sennett et al.

[11] Patent Number: 4,991,461
[45] Date of Patent: Feb. 12, 1991

[54] GEAR KNOB

[75] Inventors: Michael T. Sennett; Leonard Neal, both of Windsor, Canada

[73] Assignee: Tamco Limited, Windsor, Canada

[21] Appl. No.: 414,610

[22] Filed: Sep. 28, 1989

Related U.S. Application Data

[63] Continuation of Ser. No. 135,835, Dec. 21, 1987, abandoned.

[51] Int. Cl.⁵ .............................................. G05G 1/10
[52] U.S. Cl. ...................................... 74/553; 74/551.9; 74/558.5; 74/557; 16/121; 403/359; 403/361
[58] Field of Search .................. 74/551.9, 551.8, 558.5, 74/553, 523, 543, 557, 545; 16/121; 292/347, 348, 355; 403/361, 273, 345, 359

[56] References Cited

U.S. PATENT DOCUMENTS

| | | | |
|---|---|---|---|
| 2,301 | 11/1841 | Hotchkiss et al. | |
| 371,295 | 10/1887 | Atwater | |
| 1,621,598 | 1/1923 | Phillips | 16/121 |
| 1,687,531 | 10/1928 | Verse | 292/347 |
| 1,710,452 | 4/1929 | Drolette et al. | 16/121 |
| 1,848,892 | 3/1932 | Kollmar | 292/347 |
| 1,919,455 | 7/1928 | Wilson | 74/553 |
| 2,182,007 | 11/1937 | Tegarty | 16/121 |
| 2,425,611 | 8/1947 | Frost et al. | |
| 2,704,668 | 3/1955 | Park | 74/551.9 |
| 3,484,808 | 10/1969 | Conterno | 16/121 |
| 3,699,613 | 10/1972 | Skinner | 16/121 |
| 3,909,878 | 10/1975 | Natinsky | 16/121 |
| 4,685,189 | 8/1987 | Palmqvist | 74/551.9 |
| 4,729,256 | 3/1988 | Kelson | 74/551.9 |

FOREIGN PATENT DOCUMENTS

| | | | |
|---|---|---|---|
| 258392 | 11/1963 | Australia | 16/121 |
| 350665 | 6/1931 | United Kingdom | 16/121 |
| 1168072 | 10/1969 | United Kingdom | 16/121 |

Primary Examiner—Alexander Grosz
Assistant Examiner—F. Saether
Attorney, Agent, or Firm—Ridout & Maybee

[57] ABSTRACT

A knob for a gear lever comprises a cap, a gripping section having an axial bore through it and gear teeth about one end of the bore, and an annular anti-rotation member having an axial bore through it and gear teeth about each end of the bore. When assembled, a stem of the cap passes through the axial bores of the gripping section and of the anti-rotation member. The gear teeth of the gripping section mesh with the gear teeth of the anti-rotation member and prevent the member from rotating with respect to the gripping section. A base has an axial bore through it and gear teeth about one end of the bore. The bore has inwardly projecting ribs between which, when the knob is assembled, a spline of the stem of the cap fits at substantially all rotational positions of the spline relative to the base. The gear teeth of the anti-rotation member mesh with the gear teeth of the base and prevent the anti-rotation member from rotating with respect to the base.

27 Claims, 6 Drawing Sheets

GEAR KNOB

This application is a continuation of application Ser. No. 07/135,835, filed Dec. 21, 1987 now abandoned.

FIELD OF THE INVENTION

This invention relates to a knob for a lever and particularly, but not exclusively, a knob for a gear lever.

BACKGROUND TO THE INVENTION

A knob for a gear lever of a motor vehicle has a useful and a decorative function. The knob covers rough edges of and a small cross sectional area end of the lever to prevent puncture wounds in accidents and provides a better grip for a user of the gear lever. However, the knob must be sufficiently decorative so as not to adversely affect the decor of the interior of the vehicle. Also, with the almost exclusive use of mass production techniques in the automobile industry, the knob must be relatively inexpensive to manufacture and easy to install.

The prior art knobs generally comprise a base and a cap which fits on the base. The cap and base are usually moulded from plastic and often at least one part is chrome plated for decorative purposes. The base is usually circular in cross-section and has an axial bore into which a gear lever passes in use. The cap usually has a stem depending from, or a circular recess defined in, one end. If the cap has a stem, the top end of the axial bore of the base is widened to receive the stem. Alternatively, if the cap has a recess, the top end of the base is pushed into the recess in the cap. To provide a good grip for a user of the gear lever, it is necessary that the cap and base do not rotate relative to each other or to the lever. Therefore, it is known to provide the co-acting portions of the cap and base with a longitudinal spline and corresponding recess which must be aligned by an operator during assembly of the knob. Aligning the spline and recess is a time consuming and labour intensive operation which is not conducive to mass production. Also during assembly, an end of the gear lever is pushed into the bore of the base and secured in it. The gear lever may be secured in the base by providing an interference fit of the gear lever in the bore or by coating the end of the gear lever with adhesive.

U.S. Pat. No. 2,182,007 discloses a knob in which the cap and base are provided with complementary threads. During assembly, the cap is screwed on the base. However, this is no more efficient in mass production than aligning a spline and recess. This patent also discloses a knob in which the cap and base are glued together. However, merely glueing the cap and base together does not provide a better solution as this operation is messy, time consuming and the glue often discolours the plastic from which the knob is moulded.

If the knob comprises more than two parts, the problems are magnified as during assembly of the knob, an operator is required to align two to three sets of splines and recesses or threads rather than a single set as with the two piece knobs.

An object of this invention is to provide a knob for a lever which is easily assembled, securely attached to the lever and the parts comprising the knob do not rotate relative one another.

SUMMARY OF THE INVENTION

In one aspect, this invention provides a knob for a lever having a lateral shoulder comprising a cap having a stem integral with the cap and depending centrally from one end thereof and a ring gear having a multiplicity of gear teeth about the stem, the stem having an axial bore extending inwardly from its distal end, a base formed separately from the cap and having an axial bore through it and a ring gear having a multiplicity of gear teeth about one end of the bore, a portion of the axial bore in the base receiving a portion of the stem of the cap therein and the gear teeth about the stem of the cap meshing with the gear teeth about the bore of the base preventing the cap from rotating with respect to the base, and the knob mountable on the lever with the lever passing through the bore of the base and engaging a portion of the bore of the stem in an interference fit, and the cap holding the base between it and the lateral shoulder of the lever.

In a further aspect, this invention provides a knob for a lever having a lateral shoulder comprising a cap having a stem integral with the cap and depending centrally from one end thereof and a ring gear having a multiplicity of gear teeth about the stem, the stem having an axial bore extending inwardly from its distal end, an annular anti-rotation member having an axial bore through it and a ring gear having a multiplicity of gear teeth about each end of the bore, the stem of the cap passing through the axial bore of the anti-rotation member and the gear teeth about the stem of the cap meshing with the gear teeth about the bore on one end of the anti-rotation member, preventing the anti-rotation member from rotating with respect to the cap, a base having an axial bore through it and a ring gear having a multiplicity of gear teeth about one end of the bore, a portion of the axial bore in the base receiving a portion of the stem of the cap therein, and the gear teeth about the bore of the anti-rotation member meshing with the gear teeth about the bore of the base preventing the anti-rotation member from rotating with respect to the base, and the knob mountable on the lever with the lever passing through the bore of the base and engaging a portion of the bore of the stem in an interference fit, and the cap holding the anti-rotation member and the base between it and the lateral shoulder of the lever.

In a still further aspect, this invention provides a knob for a lever having a lateral shoulder comprising a cap having a stem integral with the cap and depending centrally from one end thereof, the stem having an axial bore extending inwardly from its distal end and a spline extending longitudinally on its outer surface, a gripping section having an axial bore through it and a ring gear having a multiplicity of gear teeth about one end of the bore, the stem of the cap passing through the axial bore of the gripping section, a base having an axial bore through it and a ring gear having a multiplicity of gear teeth about one end of the bore, a portion of the axial bore in the base receiving portion of the stem of the cap therein and having a multiplicity of inwardly projecting ribs between which the spline on the stem of the cap fits at substantially all rotational positions of the spline relative to the base, and the gear teeth about the bore of the gripping section meshing with the gear teeth about the bore of the base preventing the gripping section from rotating with respect to the base, and the knob mountable on the lever with the lever passing through the bore of the base and the bore of the stem and engaging a portion of the bore of the stem in an interference fit, and the cap holding the gripping member and the base between it and the lateral shoulder of the lever.

In a yet further aspect, this invention provides a knob for a lever having a lateral shoulder comprising a cap having a stem integral with the cap and depending centrally from one end thereof, the stem having an axial bore extending inwardly from its distal end and a spline extending longitudinally on its outer surface, a gripping section having an axial bore through it and a ring gear having a multiplicity of gear teeth about one end of the bore, the stem of the cap passing through the axial bore of the gripping section, an annular anti-rotation member having an axial bore through it and a ring gear having a multiplicity of gear teeth about each end of the bore, the stem of the cap passing through the axial bore of the anti-rotational member and the gear teeth about the bore of the gripping section meshing with the gear teeth about one end of the bore of the anti-rotation member preventing the anti-rotation member from rotating with respect to the gripping section, a base having an axial bore through it and a ring gear having a multiplicity of gear teeth about one end of the bore, a portion of the axial bore in the base receiving a portion of the stem of the cap therein and having a multiplicity of inwardly projecting ribs between which the spline on the stem of the cap fits at substantially all rotational positions of the spline relative to the base, and the gear teeth about the bore of anti-rotation member meshing with the gear teeth about the bore of the base preventing the anti-rotation member from rotating with respect to the base, and the knob mountable on the lever with the lever passing through the bore of the base and the bore of the stem and engaging a portion of the bore of the stem in an interference fit, and the capholding the gripping member, anti-rotation member and the base between it and the lateral shoulder of the lever.

BRIEF DESCRIPTION OF THE DRAWINGS

An embodiment of the invention is described, by way of example only, with reference to the following drawings in which.

DETAILED DESCRIPTION OF THE PREFERRED EMBODIMENTS

Figure 1:
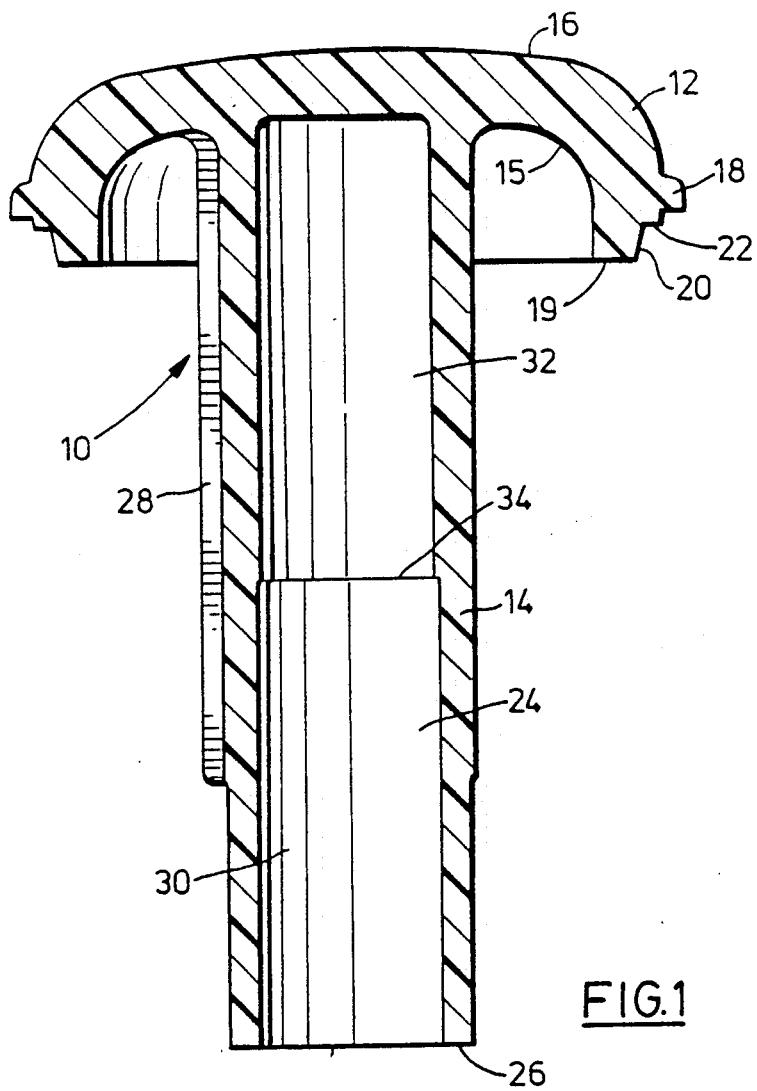
FIG. 1 is a cross-sectional view of a cap for a knob.
Figure 2:
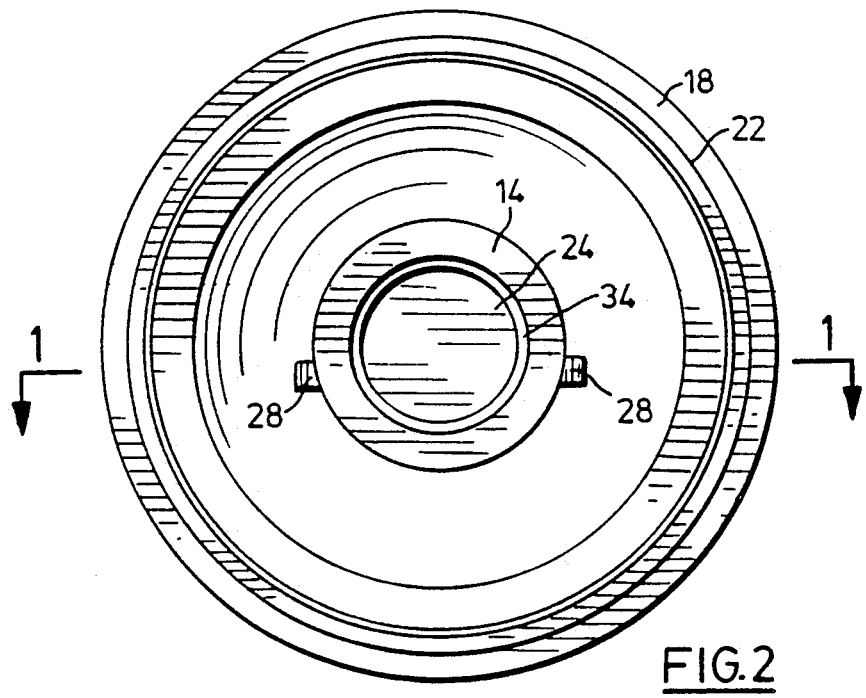
FIG. 2 is a bottom view of the cap of FIG. 1.

Referring to FIGS. 1 and 2, a cap, generally indicated by the numeral 10, comprises a circular, domed, shell 12, having a cylindrical stem 14 depending centrally from its inner side 15. The exterior surface 16 of the shell 12 is rounded or dome like and has a peripheral, outwardly-projecting, flange 18 spaced a small distance from its lower edge 19. A peripheral indentation 20 is provided between the lower edge 19 of the shell and the flange 18 to define a lateral shoulder 22 under the flange 18. The cylindrical stem 14 has an axial bore 24 extending inwardly from its distal end 26 to the shell 12. A pair of generally opposing splines 28 extend longitudinally down the exterior surface of the stem 14 from the shell 12 to a position spaced from the distal end 26. The pair of splines 28 are not aligned symmetrically about the stem but are offset slightly to one side of the stem. The axial bore 24 of the stem 14 has a larger diameter in its lower distal portion 30 than in its upper portion 32. A small annular shoulder 34 in the bore 24 separates the lower portion 30 from the upper portion 32.

Figure 3:
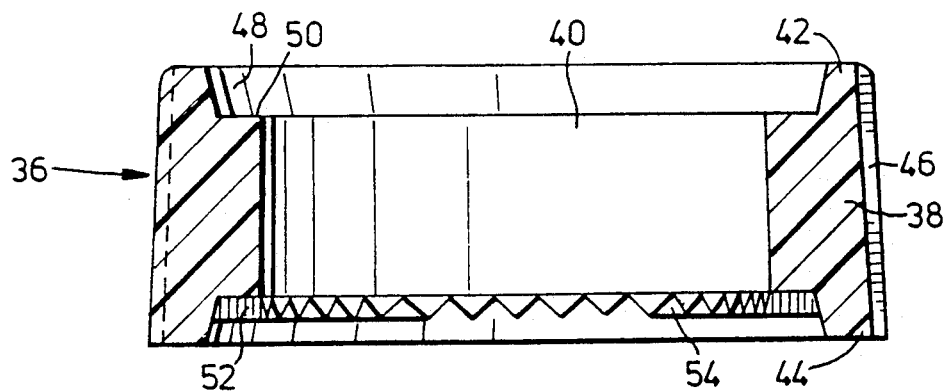
FIG. 3 is a cross-sectional view of a gripping section for a knob.
Figure 4:
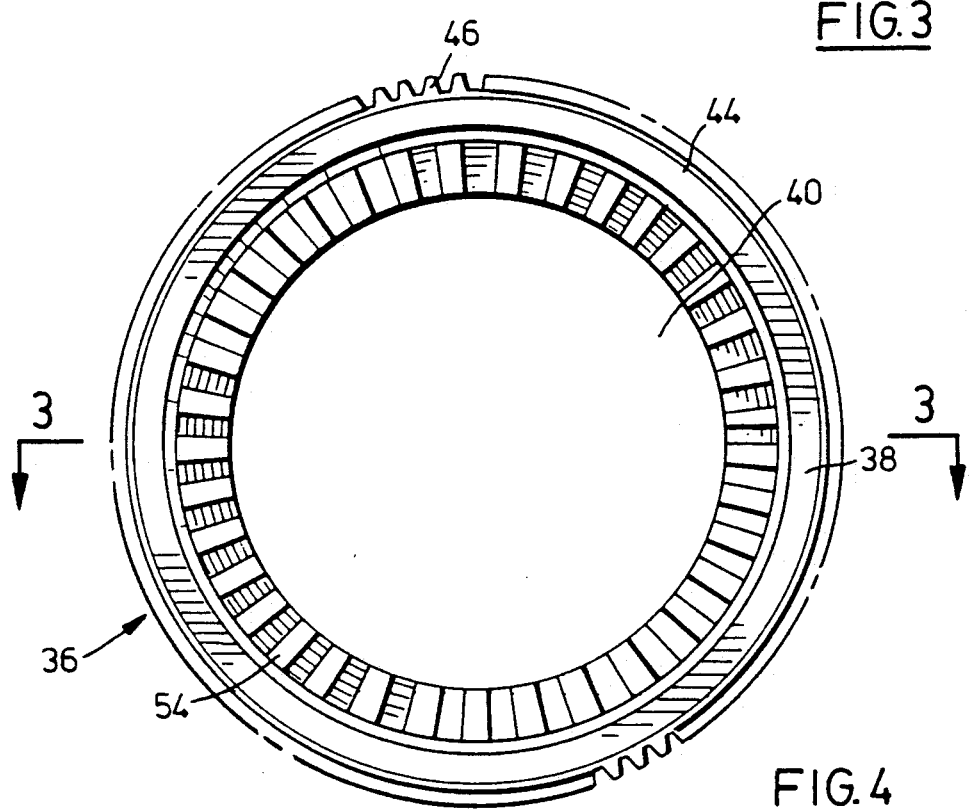
FIG. 4 is a bottom view of the gripping section of FIG. 3.

Referring to FIGS. 3 and 4, a gripping section, generally indicated by the numeral 36, comprises a cylindrical member 38 having an axial bore 40. The cylindrical member 38 tapers slightly outwardly from its upper surface 42 to its lower surface 44 and has a multiplicity of longitudinal grooves 46 defined in its outer surface. The grooves 46 provide a better grip for a user of a knob. The upper portion of the axial bore 40 is widened to provide a shallow recess 48 and an annular shoulder 50. During assembly of the knob, the cap 10 is placed on the gripping section 36 with the stem 14 of the cap passing through the axial bore 40 of the gripping section. The lateral shoulder 22 of the shell 12 engages the upper edge 42 of the gripping section. The bore 40 of the gripping section is widened adjacent its lower edge 44 to provide an annular shoulder 52 having a multiplicity of serrations or teeth 54 in the form a ring gear about the bore.

Figure 5:
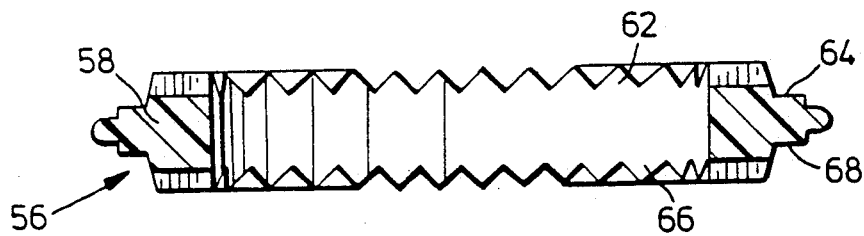
FIG. 5 is a cross-sectional view of an annular anti-rotation member for a knob.
Figure 6:
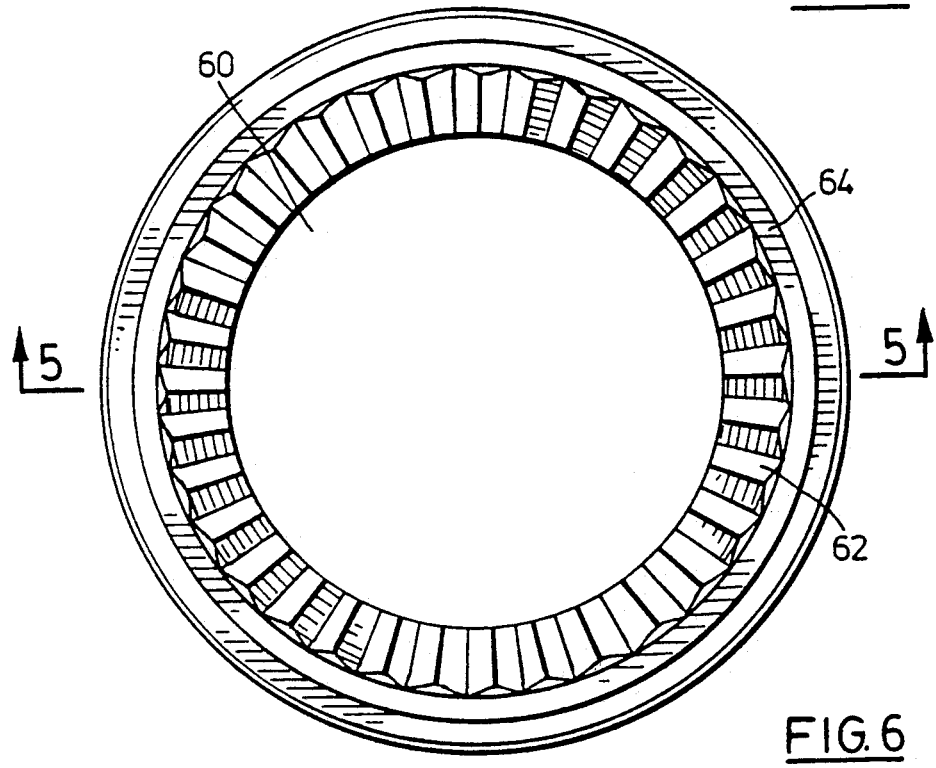
FIG. 6 is a top view of the anti rotation member of FIG. 5.

Referring to FIGS. 5 and 6, an annular anti-rotation member generally indicated as 56, comprises an annular member 58 having an axial bore 60. The annular member 58 has ring of gear teeth 62 upstanding from its upper surface 64 about the bore 60 and a ring of gear teeth 66 upstanding from the lower surface 68 about the bore 60. During assembly of the knob, the gripping section 36 is placed on the anti-rotation member 56 with the upper ring of gear teeth 62 of the anti-rotation member 56 meshing with the ring of gear teeth 54 of the gripping section. The upper surface 64 of the anti-rotation member 56 engages the lower surface 44 of the gripping section 36.

Figure 7:
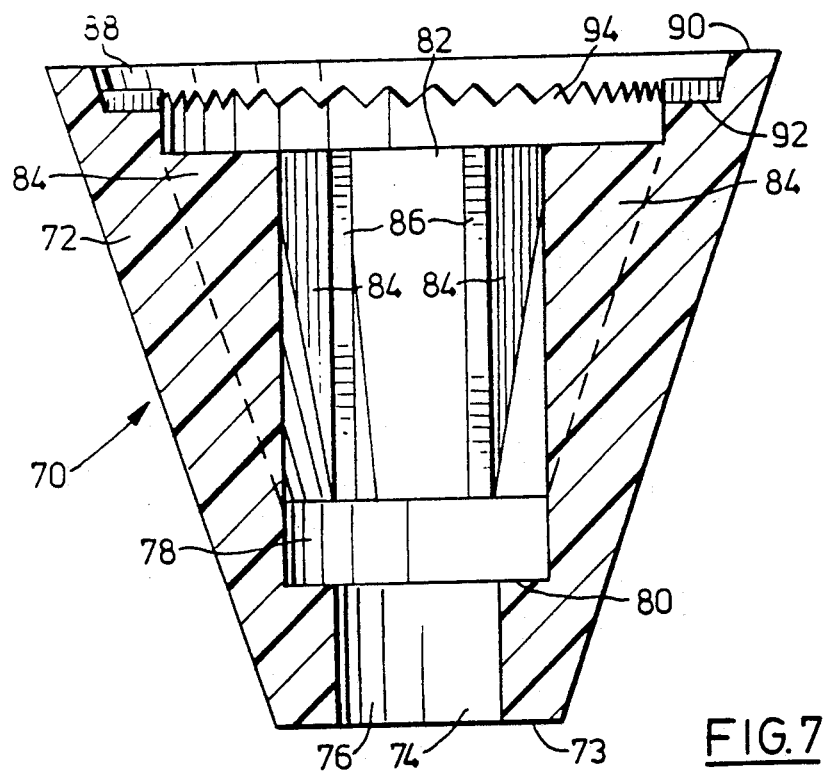
FIG. 7 is a cross-sectional view of a base for a knob.
Figure 8:
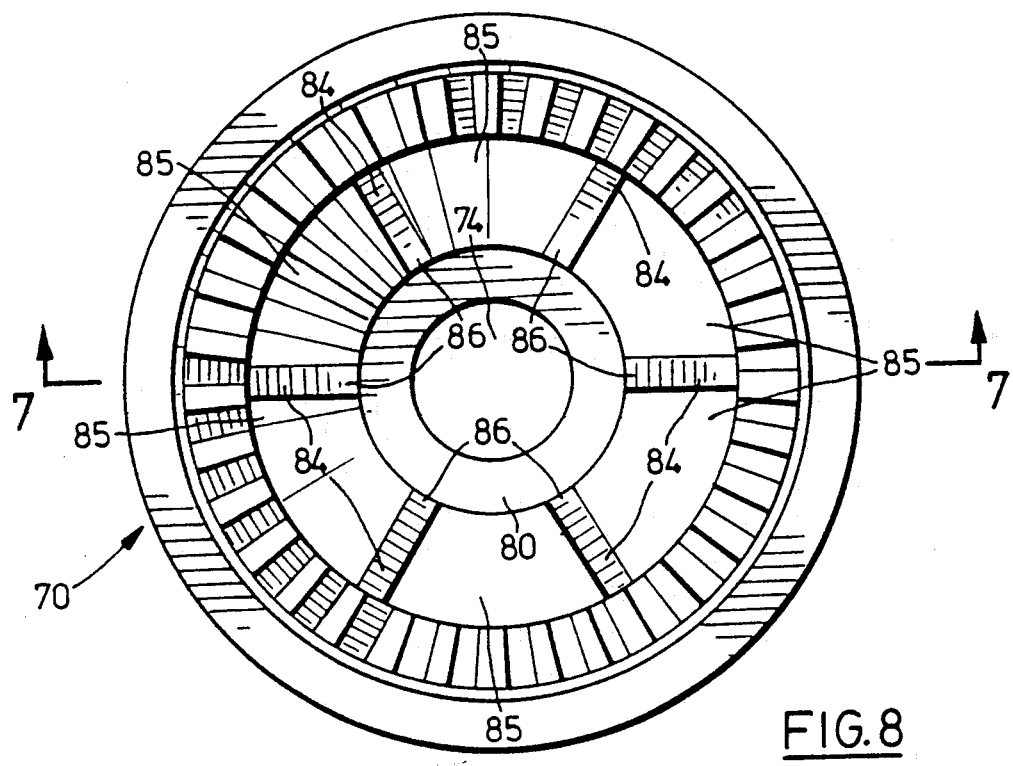
FIG. 8 is a top view of the base of FIG. 7.
Figure 10:
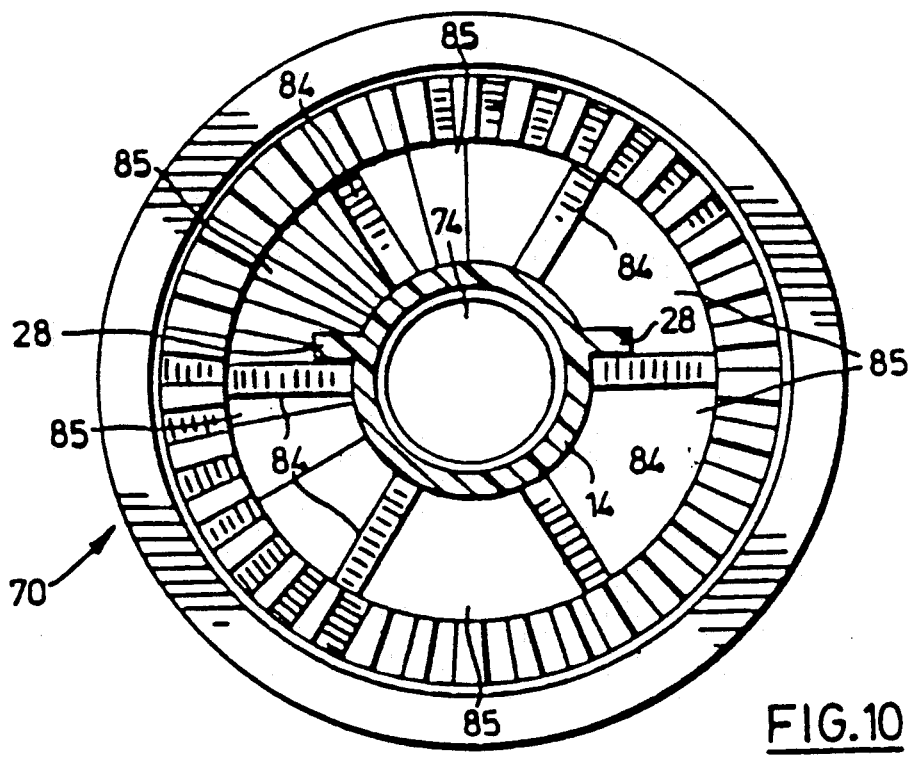
FIG. 10 is a top cross-sectional view showing the knob assembled together in one position.
Figure 11:
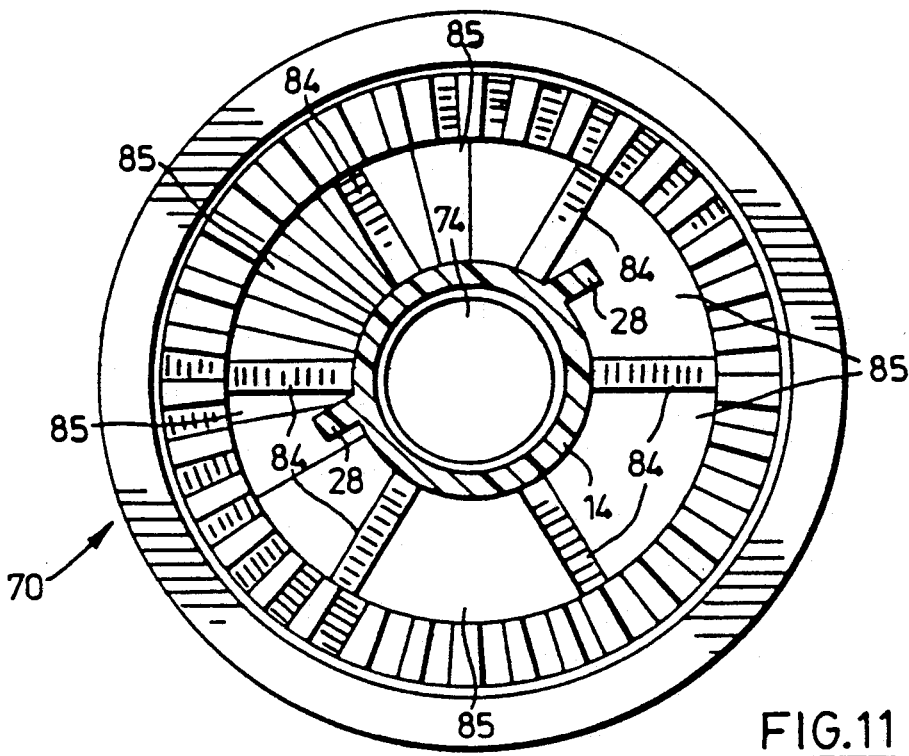
FIG. 11 is a view similar to FIG. 10, showing the known assembled together in a second position.

Referring to FIGS. 7 and 8, a base for a knob, generally indicated the numeral 70 comprises a conical frustrum 72 having an axial bore 74 through it. The bore 74, at its lower section 76, has approximately the same diameter as the diameter of the bore 24 in the lower section 30 of the stem 14 of the cap 10. Above the lower section 76, an intermediate section 78 of the bore 74 has a diameter equal to the outer diameter of the lower section 30 of the stem 14. An annular shoulder 80 is provided between the intermediate section 78 and the lower section 76. An upper section 82 of the bore 74 is provided above the intermediate section 78. The diameter of the bore 74 in the upper section 82 increases up the bore 74 to provide a conical frustum shaped recess. Six diametrically opposing and inwardly directed ribs 84, each separated from each other by equal rib spaces 85, extend longitudinally in the upper section 82 of the bore 74. The inner edge 86 of each rib 84 is spaced a distance equal to the diameter of the intermediate section 78 from the inner edge of the rib 84 diametrically opposing thereto. An annular recess 88 is defined about the bore 74 at the upper face 90 of the base 70. The recess defines an annular shoulder 92 which has a ring of gear teeth 94 about the bore 74. During assembly of the knob, an anti-rotation member 56, which has a gripping section 36 and, in turn, a cap 10 mounted on it, is mounted on the base 70. The lower ring of teeth 66 about the bore of the anti-rotation member 56 meshes with the ring of teeth 94 about the bore of the base 70. The upper face 90 of the base engages the lower face 68 of the anti-rotation member 56. The stem 14 of the cap extends into the bore 74 of the base 70. The distal end 26 of the stem 14 engages the annular shoulder 80 between the intermediate section 78 and the lower section 76 of the bore 74 while the lower or distal portion of the stem 14 is snugly received in the intermediate section 76. The inner edges 86 of the ribs 84 touch the outer surface of the stem 14 of the cap. As seen in the drawings; each set of the gear teeth 54, 62, 66, 94 project from a plane perpendicular to the axis of the knob. The intermeshing gears prevent the base 70, anti-rotation member 56, and grip section 36 from rotating relative to one another. The inter-engagement of the splines 28 on the stem 14 of the cap 10, with the ribs 84 of the base 70, present a further anti-rotational structural feature of the invention. On assembly, the splines 28 can be received between the ribs 84 in two possible positions, as shown in FIGS. 10 and 11. In one position, shown in FIG. 10, the pair of splines 28 on the stem 14 projects adjacent diametrically opposed ribs 84. Due to the offset positioning of the splines, they will tightly abut opposite faces of the diametrically opposed ribs 84 in this position and virtually no lateral movement of the cap 10 relative to the base 70 will be possible. In the position shown in FIG. 11, the offset splines will be inserted adjacent opposite faces of ribs 84 at 2 o'clock and 4 o'clock, and thus separated by a single rib 84 or by two rib spaces 85. Once the splines 28 are positioned between the ribs 84 in this manner, the cap may only rotate relative to the base by a minute amount before a spline 28 engage a rib 84. As a multiplicity of ribs 84 are provided in the bore 74, the pair of splines 28 fits between the ribs 84 at substantially all rotational positions, in either of the arrangements shown in FIGS. 10 or 11. Therefore, positioning of the splines and ribs during assembly of the knob is a simple operation.

Figure 9:
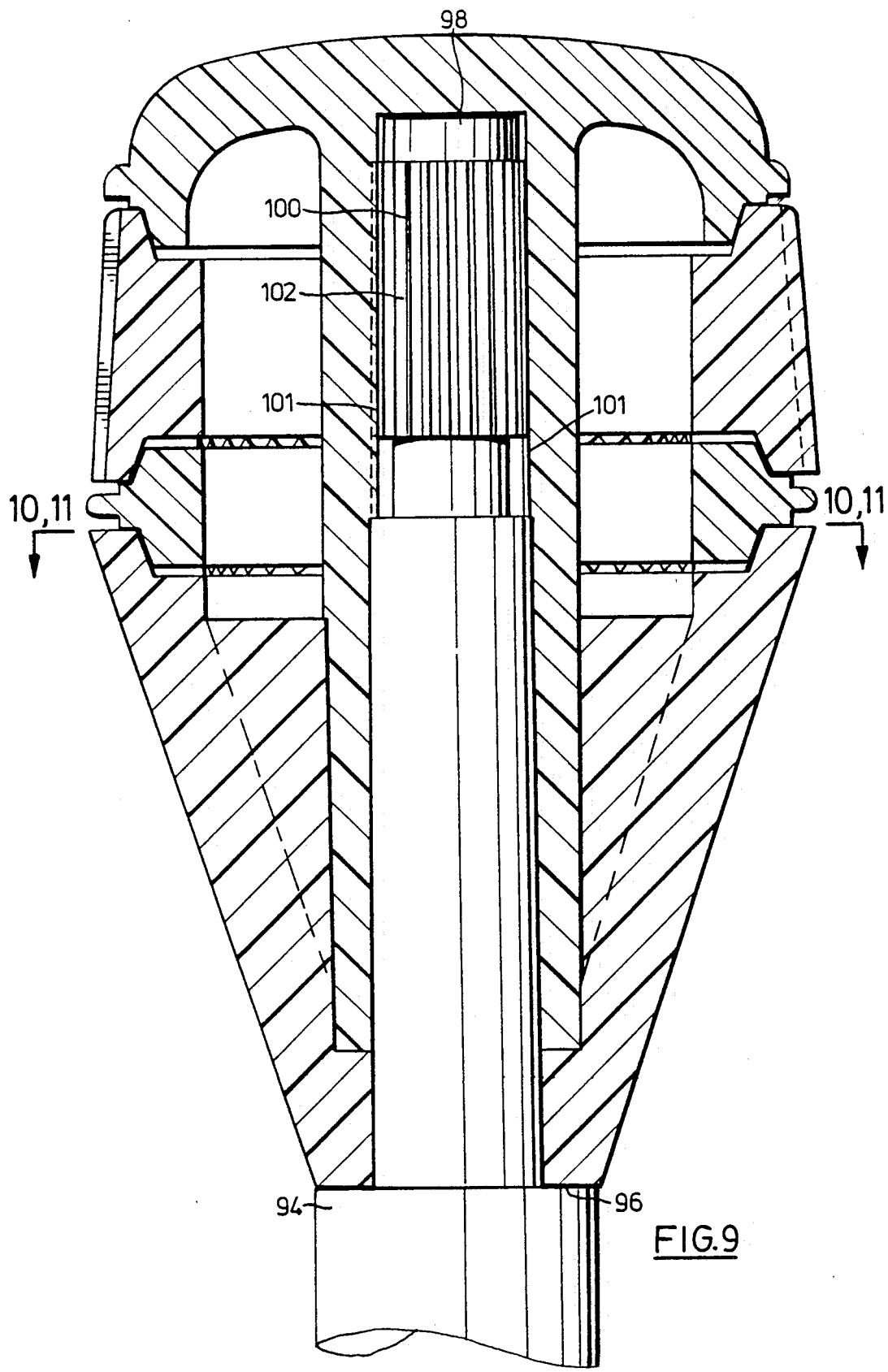
FIG. 9 is a cross-sectional view of an assembled knob on a lever.

Referring to FIG. 9, an assembled knob mounted on a lever 95 is illustrated. The lever 94 has a lateral shoulder 96 spaced from its upper end 98. A multiplicity of longitudinal splines 100 are provided on the lever 95 in an upper section 102. The diameter of the lever above the lateral shoulder 96 is just slightly less than the diameter of the lower section 30 of the bore 24 of the stem 14. Therefore, during assembly of the knob, the section of the lever above the lateral shoulder 96 is received snugly in the bore of the base and stem until the upper section 102 of the lever 94 engages the annular shoulder 34 between the upper section 32 and the lower section 30 of the stem 14. The reduced diameter of the upper section 32 of the bore in the stem 14 provides that the fit of the upper section 102 of the lever within the upper section 32 is an interference fit with the splines 100 each gouging a complementary recess 101 into the surface of the upper section 32 as the lever is forced into the stem. Therefore, forcing of the upper section of the lever 102 into the upper section 32 effects the secure engagement of the stem 14 to the lever 94 and with the splines 100 preventing the knob from rotating relative to the lever. When the lever is fully extended into the knob, the lower face 73 of the base 70 is held against the lateral shoulder 96 of the lever by the cap 10 through the anti-rotation member 56 and gripping section 36.

The invention thus provides a simple yet effective knob for a lever which is easily assembled and securely attached to the lever without the need for adhesives, screw threads, or alignment of splines and recesses.

The cap 10, gripping section 36, anti-rotation member 56 and base 70, may be conveniently moulded from suitable plastics with the stem 14 moulded integrally with the cap 10. For decorative purposes, each of the cap 10, anti-rotation member 56, gripping member 36 and base 70 may have a surface finish distinctly different in appearance from any other. For example, the cap 10 and the anti-rotation member 56 may be chrome plated. Alternatively, the base 70 and the gripping section 36 may be chrome plated.

The formation of the knob in four parts is primarily for decorative purposes in that a knob may be provided which has a number of different surface finishes without any part of the knob having more than one surface finish. However, it is clear that the invention may provide a knob with two or three parts.

It is not necessary for the rings of the gear teeth to face toward the axial ends of the components of the knobs. The rings of gear teeth may extend longitudinally about the bore of the various components and face radially outward or inward. In this embodiment, the co-acting portions of a pair of co-acting parts of the knob would be a male portion on one part and a female portion on the other part.

We claim:

1. A knob for a lever having a lateral shoulder comprising:
    a cap assembly having a cap with a stem integral with the cap and depending centrally from one end thereof and ring gear means having a multiplicity of gear teeth about the stem, the stem having an axial bore extending inwardly from its distal end, and two splines extending longitudinally on its outer surface on opposite faces thereof, the splines not being aligned symmetrically about the stem but offset slightly to one side; a base formed separately from the cap and having an axial bore through it and a ring gear having a multiplicity of gear teeth about one end of the bore, a portion of the axial bore in the base receiving a portion of the stem of the cap therein and having a multiplicity of inwardly projecting ribs between which the splines on the stem of the cap fit at substantially all rotational positions of the splines relative to the base, with one spline engageable on only one face of one rib to prevent substantially all rotation of the stem relative to the base in one rotational direction and the other spline engageable only with the opposite face of a second rib to prevent substantially all rotation of the stem relative to the base in the opposite rotational direction and the gear teeth about the stem of the cap meshing with the gear teeth about the bore of the base preventing the cap from rotating with respect to the base; and
    the knob mountable on the lever with the lever passing through the bore of the base and engaging a portion of the bore of the stem in an interference fit, and the cap holding the base between it and the lateral shoulder of the lever.

2. A knob according to claim 1 in which the bore of the stem has a larger diameter adjacent its distal end than adjacent the opposite end and the lever fitting into the end of the bore of the stem having the smaller diameter in an interference fit.

3. A knob according to claim 1 in which the bore of the base has a portion of a larger diameter adjacent the end having the ring gear about it than adjacent the opposite end, the larger diameter portion receiving the distal end of the stem snugly in it and a portion of the bore in the base having a smaller diameter receiving the lever snugly in it.

4. A knob according to claim 1 in which one of the cap and the base has a surface finish distinctively different in appearance from the other.

5. A knob according to claim 4 in which one of the cap and the base is chrome plated.

6. A knob according to claim 1, wherein the splines are simultaneously engaged on opposite faces of diametrically opposed ribs.

7. A knob for a lever having a lateral shoulder comprising:

a cap assembly having a cap with a stem integral with the cap and depending centrally from one end thereof and ring gear means having a multiplicity of gear teeth about the stem, the stem having an axial bore extending inwardly from its distal end, and two splines extending longitudinally on its outer surface on opposite faces thereof, the splines not being aligned symmetrically about the stem but offset slightly to one side;

an annular anti-rotation member having an axial bore through it and a ring gear having a multiplicity of gear teeth about each end of the bore, the stem of the cap passing through the axial bore of the anti-rotation member and the gear teeth about the stem of the cap meshing with the gear teeth about the bore on one end of the anti-rotation member, preventing the anti-rotation member from rotating with respect to the cap;

a base having an axial bore through it and a ring gear having a multiplicity of gear teeth about one end of the bore, a portion of the axial bore in the base receiving a portion of the stem of the cap therein and having a multiplicity of inwardly projecting ribs between which the splines on the stem of the cap fit at substantially all rotational positions of the splines relative to the base, with one spline engageable on only one face of one rib to prevent substantially all rotation of the stem relative to the base in one rotational direction and the other spline engageable only with the opposite face of a second rib to prevent substantially all rotation of the stem relative to the base in the opposite rotational direction and the gear teeth about the bore of the anti-rotation member meshing with the gear teeth about the bore of the base preventing the anti-rotation member from rotating with respect to the base; and the knob mountable on the lever with the lever passing through the bore of the base and engaging a portion of the bore of the stem in an interference fit, and the cap holding the anti-rotation member and the base between it and the lateral shoulder of the lever.

8. A knob according to claim 7 in which the bore of the stem has a larger diameter adjacent its distal end than adjacent the opposite end and the lever fitting into the end of the bore of the stem having the smaller diameter in an interference fit.

9. A knob according to claim 7 in which the bore of the base has a portion of a larger diameter adjacent the end having the ring gear about it than adjacent the opposite end, the larger diameter portion receiving the distal end of the stem snugly in it and a portion of the bore in the base having the smaller diameter receiving the lever snugly in it.

10. A knob according to claim 7 in which at least one of the cap, base and anti-rotation member has a surface finish distinctively different in appearance from any other.

11. A knob according to claim 10 in which at least one of the cap, base and anti-rotation member is chrome plated.

12. A knob according to claim 7, wherein the splines are simultaneously engaged on opposite faces of diametrically opposed ribs.

13. A knob for a lever having a lateral shoulder comprising:

a cap having a stem integral with the cap and depending centrally from one end thereof, the stem having an axial bore extending inwardly from its distal end, and two splines extending longitudinally on its outer surface and on opposite faces thereof, the splines not being aligned symmetrically about the stem, but offset slightly to one side;

a middle section assembly having a gripping section with an axial bore through it and ring gear means having a multiplicity of gear teeth about one end of the bore, the stem of the cap passing through the axial bore of the gripping section;

a base having an axial bore through it and a ring gear having a multiplicity of gear teeth about one end of the bore, a portion of the axial bore in the base receiving a portion of the stem of the cap therein and having a multiplicity of inwardly projecting ribs between which the splines on the stem of the cap fit at substantially all rotational positions of the splines relative to the base, with one spline engageable on only one face of one rib to prevent substantially all rotation of the stem relative to the base in one rotational direction and the other spline engageable only with the opposite face of a second rib to prevent substantially all rotation of the stem relative to the base in the opposite rotational direction and the gear teeth about the bore of the anti-rotation member meshing with the gear teeth about the bore of the base preventing the gripping section from rotating with respect to the base; and the knob mountable on the lever with the lever passing through the bore of the base and engaging a portion of the bore of the stem in an interference fit, and the cap holding the gripping-section and the base between it and the lateral shoulder of the lever.

14. A knob according to claim 13 in which the bore of the stem has a larger diameter adjacent its distal end than adjacent the opposite end and the lever fitting into the end of the bore of the stem having the smaller diameter in an interference fit.

15. A knob according to claim 13 in which the bore of the base has a portion of a large diameter adjacent the end having the ring gear about it than adjacent the opposite end, the larger diameter receiving the distal end of the stem snugly in it and a portion of the bore of the base having the smaller diameter receiving the lever snugly in it.

16. A knob according to claim 13 in which a pair of splines is provided on generally opposing sides of the stem and offset to one side.

17. A knob according to claim 13 in which at least one of the cap, base and gripping section has a surface finish distinctively different in appearance from any other.

18. A knob according to claim 17 in which at least one of the cap, base and gripping section is chrome plated.

19. A knob according to claim 13, wherein the splines are simultaneously engaged on opposite faces of diametrically opposed ribs.

20. A knob for a lever having a lateral shoulder comprising:
a cap having a stem integral with the cap and depending centrally from one end thereof, the stem having an axial bore extending inwardly from its distal end, and two splines extending longitudinally on its outer surface on opposite faces thereof, the splines not being aligned symmetrically about the stem but offset slightly to one side;
a gripping section having an axial bore through it and a ring gear having a multiplicity of gear teeth about one end of the bore, the stem of the cap passing through the axial bore of the gripping section;
an annular anti-rotation member having an axial bore through it and a ring gear having a multiplicity of gear teeth about each end of the bore, the stem of the cap passing through the axial bore of the anti-rotation member and the gear teeth about the stem of the cap meshing with the gear teeth about the bore on one end of the anti-rotation member, preventing the anti-rotation member from rotating with respect to the gripping section;
a base having an axial bore through it and a ring gear having a multiplicity of gear teeth about one end of the bore, a portion of the axial bore in the base receiving a portion of the stem of the cap therein and having a multiplicity of inwardly projecting ribs between which the splines on the stem of the cap fit at substantially all rotational positions of the splines relative to the base, with one spline engageable on only one face of one rib to prevent substantially all rotation of the stem relative to the base in one rotational direction and the other spline engageable only with the opposite face of the second rib to prevent substantially all rotation of the stem relative to the base in the opposite rotational direction and the gear teeth about the bore of the anti-rotation member meshing with the gear teeth about the bore of the base, preventing the anti-rotation member from rotating with respect to the base; and
the knob mountable on the lever with the lever passing through the bore of the base and engaging a portion of the bore of the stem in an interference fit, and the cap holding the gripping section, anti-rotation member and the base between it and the lateral shoulder of the lever.

21. A knob according to claim 20 in which the bore of the stem has a larger diameter adjacent its distal end than adjacent the opposite end and the lever fitting into the end of the bore of the stem having the smaller diameter in an interference fit.

22. A knob according to claim 20 in which the bore of the base has a portion of a larger diameter adjacent the end having the ring gear about it than adjacent the opposite end, the larger diameter receiving the distal end of the stem snugly in it and a portion of the bore of the base having the smaller diameter receiving the lever snugly in it.

23. A knob according to claim 20 in which a pair of splines is provided on generally opposing sides of the stem and offset to one side.

24. A knob according to claim 20 in which at least one of the cap, base, anti-rotation member and gripping section has a surface finish distinctively different in appearance from any other.

25. A knob according to claim 24 in which at least one of the cap, base, anti-rotation member and gripping section is chrome plated.

26. A knob according to claim 25 in which the cap and the anti-rotation member are chrome plated.

27. A knob according to claim 20, wherein the splines are simultaneously engaged on opposite faces of diametrically opposed ribs.

* * * * *